United States Patent [19]

Ruppel

[11] Patent Number: 4,637,065
[45] Date of Patent: Jan. 13, 1987

[54] BROADBAND SOLID STATE ANTENNA SWITCH

[75] Inventor: John S. Ruppel, North Richland Hills, Tex.

[73] Assignee: Motorola, Inc., Schaumburg, Ill.

[21] Appl. No.: 851,992

[22] Filed: Apr. 14, 1986

Related U.S. Application Data

[63] Continuation of Ser. No. 607,531, May 7, 1984, abandoned.

[51] Int. Cl.[4] ............................................. H04B 1/48
[52] U.S. Cl. ...................................... 455/78; 455/83; 333/103
[58] Field of Search ........................ 455/78–83; 333/101, 103, 104; 307/241, 242, 256, 259

[56] References Cited

U.S. PATENT DOCUMENTS

| | | | |
|---|---|---|---|
| 2,959,778 | 11/1960 | Bradley | 333/103 |
| 3,117,241 | 1/1964 | Paynter et al. | 455/82 |
| 3,227,954 | 1/1966 | Fichter, Jr. | 455/82 |
| 3,327,215 | 6/1967 | Battin et al. | 455/80 |
| 3,475,700 | 10/1969 | Ertel | 333/104 |

FOREIGN PATENT DOCUMENTS

| | | | |
|---|---|---|---|
| 157747 | 12/1982 | Fed. Rep. of Germany | 455/83 |
| 2097226 | 10/1982 | United Kingdom | 455/83 |

*Primary Examiner*—Jin F. Ng
*Attorney, Agent, or Firm*—Donald B. Southard; F. John Motsinger; Edward M. Roney

[57] ABSTRACT

In accordance with the present invention there is provided a common antenna signal path selectively coupled to a plurality of signal energy paths, including transmitter and receiver paths. The transmitter and receiver paths are selectively coupled to the common antenna signal path by semiconductive devices capable of being variably biased from conductive to nonconductive states. In the transmit mode, the magnitude of the RF signal energy is detected and developed to adaptively maintain the disabled semiconductive device in a reverse biased or nonconducting state.

10 Claims, 3 Drawing Figures

BROADBAND SOLID STATE ANTENNA SWITCH

This is a continuation of application Ser. No. 607,531 filed May 7, 1984, now abandoned.

THE FIELD OF INVENTION

The disclosed invention, herein, is concerned with radio frequency switches.

More particularly, this invention relates to solid state antenna switches for radio transceivers.

BACKGROUND OF THE INVENTION

There are many applications where it is necessary to provide a switch for radio frequency signals. One such application is in a radio transceiver where it is desired to selectively switch an antenna to either the transmitter or receiver thereof.

Several techniques for providing an antenna switching function are known. One such system employs a pair of magnetically operated reed switches, one of which is normally closed for connecting the receiver to the antenna and another which is normally open for connecting the antenna to the transmitter. The reed switches are operated by means of a permanent magnet or electromagnet. This arrangement suffers from the disadvantage of utilizing large and bulky, high cost, fragile components corresponding in a loss of reliability.

Solid state switches provide an attractive alternative to the foregoing electromechanical arrangement. Two solid state alternatives are known. However, one suffers from limited power handling capability, while the other suffers from severe bandwidth limitations.

FIG. 1 illustrates a common PIN diode switching network. In the transmit mode the transmitter voltage $V_{TX}$ is coupled to the supply voltage while the receive voltage $V_{RX}$ is coupled to ground. The transmit voltage $V_{TX}$ forward biases diode $CR_{TX}$ and, thereby, enables the transmitter to antenna path $T_X$-A.

This configuration is very broadband since the forward path $T_X$-A includes only a forward biased PIN diode $CR_{TX}$, while the disabled path A-$R_X$ is isolation is provided by a reverse biased diode $CR_{RX}$.

However, note that the disabled path diode $CR_{RX}$ can only be reverse biased by the maximum available supply voltage minus one diode drop. The major drawback is that whenever the peak RF swings at the output node N exceed the available supply voltage, the RF signal will cause the disabled diode $CR_{RX}$ to turn on allowing power into the path intended to be disabled, thereby eliminating the transmitter to receiver isolation $T_X$-$R_X$. In land-mobile communications, the maximum available supply voltage is 12 volts or less, while transmit power can approach 150 watts and transmit voltage swings can exceed 100 volts ($>>$12 volts). Clearly, the limited power handling capability of this configuration makes it unacceptable for land-mobile applications.

An alternative configuration is illustrated in FIG. 2. In the transmit mode, both PIN diodes $CR_{TX}$ and $CR_{RX}$ are forward biased by the supply voltage $V_{TX}$ to a conducting state. A quarter wavelength transmission line is employed to reflect the effective short $CR_{RX}$ as an open circuit at the output node N. However, the major limitation of this configuration is that it contains a resonant element (i.e., the quarterwave line) that severely limits the bandwidth of the network. That is, at twice the resonant frequency, the quarter wave line would reflect a short at the output node N rather than an open circuit.

The instant invention solves the above-mentioned problems of having a broadband switching network which is able to have an adequate power handling capability by developing the required reverse bias voltage from the large RF voltage signal swings to keep the receive signal path switched off.

This invention represents a significant advance over the prior art an this technical field by providing a broadband solid state antenna switch having a high power handling capability.

BRIEF SUMMARY OF THE INVENTION

It is the object of the present invention to provide a broadband solid state antenna switch having high power handling capability.

It is the further object of the invention to provide an antenna switching system having high power handling capability yet utilizing relatively low supply voltages.

A final object of the present invention is to provide a rugged, highly reliable, small and cost effective solid state broadband antenna switch.

In accordance with the present invention, there is provided a common antenna signal path selectively coupled to a plurality of signal energy paths, including transmitter and receiver paths. The transmitter and receiver paths are selectively coupled to the common antenna signal path by semiconductive devices capable of being variably biased from conductive to non-conductive states. In the transmit mode, the magnitude of the RF signal energy is detected and developed to adaptively maintain the disabled semiconductive device in a reverse biased or nonconducting state.

Thus, there has been provided a broadband solid state antenna switch having high power handling capability using a relatively low available supply voltage.

BRIEF DESCRIPTION OF THE DRAWINGS

Additional objects, features and advantages in accordance with present invention will be more clearly understood by way of unrestricted example from the following detailed description taken together with the accompanying drawing in which.

Figure 1:
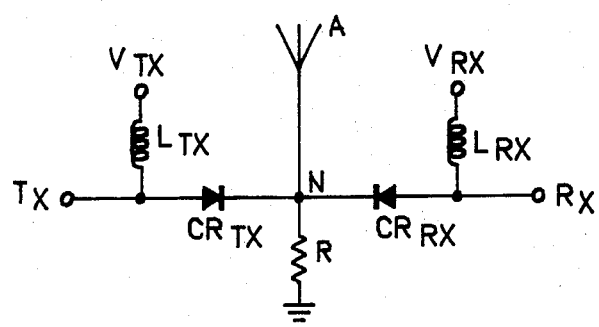
FIG. 1 illustrates a common pin diode switching network found in the prior art.
Figure 2:
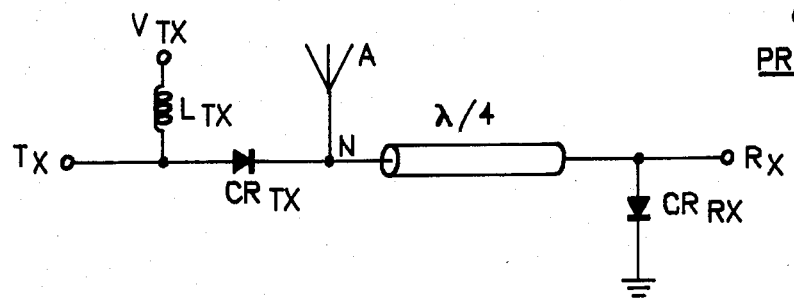

An alternative configuration is illustrated in FIG. 2, that is also found in prior art.

Figure 3:
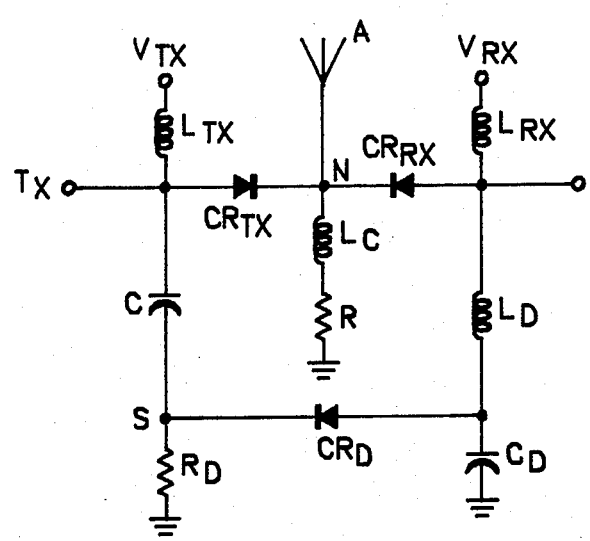

FIG. 3 is a broadband solid state antenna switch which incorporates the preferred embodiment of the present invention.

The invention will be readily appreciated by reference to the detailed description when considered with conjunction with the accompanying drawings in which like reference numerals designate like parts throughout the figures.

THE DESCRIPTION OF THE PREFERRED EMBODIMENT

FIG. 3 illustrates a broadband solid state antenna switch which incorporates the present invention.

In the receive mode, the available supply voltage is applied to $V_{RX}$, thereby forward biasing the received diode $CR_{RX}$, while $V_{TX}$ is switched to ground, thereby reverse biasing the transmit diode $CR_{TX}$. In so doing, the receiver $R_X$ is selectively coupled to the antenna A.

In the transmit mode, the supply voltage is applied to $V_{TX}$, thereby forward biasing the transmit diode $CR_{TX}$, while $V_{RX}$ is switched to a high impedance state. The reverse bias on the receive diode $CR_{RX}$ is maintained in the presence of strong transmit RF signal swings by detecting the RF swings in the transmit path and using the RF swings to provide the reverse bias on the receive diode $CR_{RX}$. In doing so, the transmitter $T_X$ is selectively coupled to the antenna A.

In the preferred embodiment, the RF signal detector is a negative peak detector. The negative peak detector is formed primarily with diode $CR_D$ and capacitor $C_D$. The negative peak value of the transmit signal $T_X$ charges capacitor $C_D$ to hold diode $CR_{RX}$ in a reverse biased and non-conducting state.

This approach is adaptive in that the negative peak detector always supplies adequate reverse bias voltage by tracking the magnitude of the transmit RF signal $T_X$. Therefore, as the transmitted power increases, the power handling capability of this circuit increases, as well.

Resistor $R_D$ is present to ensure that node S is at ground potential when $V_{TX}$ is switched to the available supply voltage and also to limit the current through diode $CR_D$ when $V_{RX}$ is connected to the supply voltage. Resistor R is used to set the diode current and is decoupled from the RF signal by choke $L_C$. Elements $L_{TX}$, $L_{RX}$, $L_D$ and C are present to further decouple the RF signals.

This configuration is very broadband since the forward path ($T_X$-A or $R_X$-A) includes only a forward biased PIN diode. Further, the disabled path isolation is provided by only a reverse biased diode ($CR_{TX}$ or $CR_{RX}$), consisting essentially of only parasitic capacitances.

Thus, there has been provided a broadband solid state antenna switch having high power handling capability yet utilizing relatively low available supply voltages.

Further, there has been provided a rugged, highly reliable, small and cost effective solid state broadband antenna switch.

It will be appreciated by those skilled in the art that a variety of networks can be utilized to develop the required reverse biased voltage from large RF voltage swings to keep the disabled signal path switch off. For example, an appropriately scaled absolute value circuit or rectifying circuit would perform the same function.

Similarly, where parasitic capacitances are sufficient, capacitor $C_D$ may be eliminated. Also, where sufficiently high impedances are presented, such as normally present in the transmitter path, the transmit $CR_{TX}$ may be eliminated.

With appropriate modifications, a symmetrical or complimentary network can be developed for multiple transmitter or redundant transmitter systems.

The foregoing description of the various embodiments are illustrative of the broad inventive concept comprehended by the invention and has been given for clarity of understanding by way of unrestricted example.

However, it is not intended to cover all changes and modifications which do not constitute departures from the spirit and scope of the invention.

What I claim and desire to secure by Letters Patent is:

1. A broadband solid state RF switch circuit for electrically coupling a common signal path alternately to a transmitter and to a receiver and having a high power handling capability while utilizing relatively low supply voltage, the RF switch circuit comprising in combination:
   first selective conducting means for electrically coupling a first signal energy path to said common signal path and controlled by a first biasing voltage;
   second selective conducting means for electrically coupling a second signal energy path to said common signal path in alternate fashion to said first selective conducting means and controlled by a second biasing voltage; and
   strong RF signal detecting means electrically coupled to said second selective conducting means for providing a reverse bias voltage electrically coupled back to said first selective conducting means, said strong RF signal detecting means adaptively tracking the magnitude of said strong RF signal at said second selective conducting means to supply adequate, variable, reverse bias voltage thereto, thereby ensuring that said first selective conducting means remains switched off to enhance the power handling capability thereof.

2. The RF switch circuit according to claim 1 wherein said common signal path comprises an antenna.

3. The RF switch circuit according to claim 1 wherein said first and second signal paths comprise a receiver signal path and a transmitter signal path respectively.

4. The RF switch circuit according to claim 1 wherein each of said first and second selective conducting means comprises:
   first and second PIN diodes having one similar lead of each coupled to a common point; and
   RF signal decoupling means for applying the biasing voltages to said first and second PIN diodes while remaining decoupled from the RF signals thereon.

5. The RF switch circuit according to claim 4 wherein said RF signal decoupling means includes a plurality of RF chokes and a resistor.

6. The RF switch circuit according to claim 1 wherein said strong RF signal detecting means comprises a detector such as an absolute value detector.

7. The RF switch circuit according to claim 1 wherein said strong RF signal detecting means comprises a detector such as a peak detector.

8. A solid state RF transmit receive switch suitable for use in a radio such as a land-mobile transceiver and capable of selectively coupling an antenna alternately to the receiver and transmitter therein, said RF transmit receive switch comprising in combination:
   a first PIN diode for electrically coupling the receiver to said antenna and controlled by a first biasing voltage;
   a second PIN diode for electrically coupling the transmitter to said antenna and controlled by a second biasing voltage; and
   transmit signal detecting means electrically coupled to said second PIN diode for providing a reverse bias voltage electrically coupled back to said first PIN diode,
   said transmit signal detecting means adaptively tracking the magnitude of the transmitted RF signal at said second PIN diode to supply adequate, variable, reverse bias to said first PIN diode, thereby ensuring that said first PIN diode remains switched off to enhance the power handling capability thereof.

9. The solid state RF transmit receive switch according to claim 8, wherein said transmit signal detecting means comprises a detector such as an absolute value detector.

10. The solid state RF transmit receive antenna switch according to claim 8 wherein said transmit signal detecting means comprises a detector such as a peak detector.

* * * * *